Figure 1:
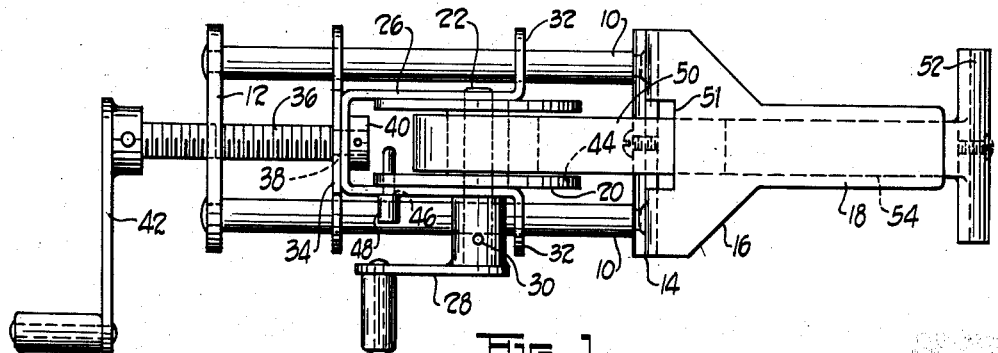

INVENTOR.
WALTER J. HARLING
BY
ATTORNEY.

United States Patent Office 3,076,646
Patented Feb. 5, 1963

3,076,646
ADJUSTABLE CLAMP
Walter J. Harling, Bedford, Ohio, assignor to
Marjorie M. Bartkus, Cleveland, Ohio
Filed Mar. 4, 1960, Ser. No. 12,707
10 Claims. (Cl. 269—221)

This invention relates to clamps and more particularly to clamps wherein a flexible tension member joins the clamping elements.

An object of this invention is to provide a clamp wherein an extensible flexible clamping element is used for clamping a wide range of sizes and shapes of workpieces.

Another object of this invention is to provide a clamp wherein a flexible extensible tension element is utilized which is stored on a reel which renders the clamp readily usable on small as well as large work.

The clamps which are presently available utilize screws for small work and elongated bars on which the clamping elements are adjustably mounted for large work. Particularly in the case of the bar clamps, the use thereof is hampered by the cumbersome nature of the clamp. The bar must be of sufficient weight to withstand the stress introduced by both tension and bending which adds to the difficulty of positioning the clamp on the work and holding the same in the desired position while the clamping force is applied. When this type of clamp is used, it is common to stock several lengths in order to have an appropriate length available for the size of the work to be clamped.

The clamp which is the preferred embodiment of my invention includes features which eliminate the problems associated with the use of previously available clamps. A flexible tension member is utilized to apply the clamping force to the faces of the clamp jaws. A hook-like jaw is affixed to the end of the flexible tension member and has a right-angle shaped body for engaging two sides of the workpiece and removing the tendency for the jaw to become disengaged from the work. A second confronting jaw or shoulder is carried by the frame of the clamp and is disposed adjacent the tension member which has the unused portion thereof wound on a reel carried by the frame and positioned to the rear of the frame jaw.

The reel is rotatably mounted on a carrier which is reciprocable in the frame toward and away from the jaw. In use, the reel is rotated to remove the slack from the tension member and then locked to the carrier against further rotation. A manually operable adjustment in the form of a screw threaded into the frame having a thrust bearing on an end engaging the carrier is actuated to apply further tension on the clamping element to the degree required.

It can be readily seen that there is no limitation to the span of the clamp jaws other than the length of the flexible tension member which can be wound on the reel. Further, the clamp may be used on circular or other odd-shaped work since it is not a prerequisite that the clamp jaws be in alinement during operation. Also, the clamp is as readily usable on relatively small work since the tension member is conveniently disposed on the reel and does not handicap the use of the clamp. The universal adjustability above referred to makes the clamp equally useful over a wide range of sizes of work and obviates the stocking and selection of several sizes of clamps for varying work proportions.

Accordingly, it is an important object of this invention to provide a clamp wherein the reelable tension member between the clamping elements is anchored by locking the reel to a carriage, the carriage then being shiftable relative to one of the clamping faces by manually adjustable means to apply compressive force to an object between the clamping elements.

A still further object of the invention is to provide removable inserts in the clamping faces, the removal of which exposes a concave recess for more effectively holding the clamp on work having a surface other than a plane surface.

Other objects and advantages more or less ancillary to the foregoing, and the manner in which all the various objects are realized, will appear in the following description, which, considered in connection with the accompanying drawings, sets forth the preferred embodiment of the invention.

Figure 2:
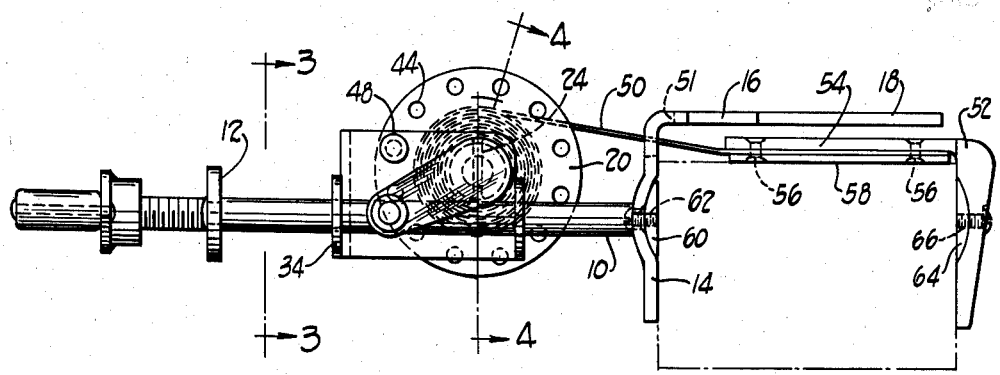
Figure 3:
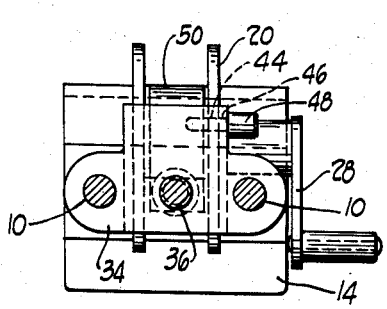
Figure 4:
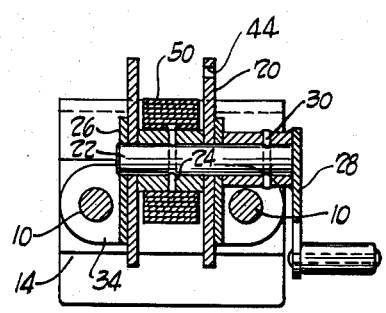

In the drawings:
FIG. 1 is a top-plan view of the preferred embodiment of my invention;
FIG. 2 is an elevational view;
FIG. 3 is a sectional view taken along line 3—3 of FIG. 2; and
FIG. 4 is a sectional view taken along line 4—4 of FIG. 2.

Referring first to FIG. 1 wherein the preferred embodiment of my invention is shown, the framework of the clamp includes a pair of parallel rods 10 spaced apart and joined at one end respectively by a perforate bar 12, which is rigidly affixed to the rods 10 by riveting, welding, or other appropriate method. The ends of the rods 10, opposite to the bar 12 are affixed to one side of a clamp jaw or shoulder 14 in perpendicular relation thereto.

A laterally extending guide 16 is unitary with the upper part of said jaw and extends in a direction generally parallel to the rods 10 and opposite thereto. The guide 16 has a narrow section 18 in alinement with the axis of the space between the rods 10.

A reel 20 is affixed to a shaft 22 by pin 24. Shaft 22 is journalled in a carrier 26 which is U-shaped for accommodating the reel 20. A crank 28 is affixed to the shaft 22 by pin 30, and manual actuation of the crank 28 in the usual manner rotates the reel 20.

The carrier 26 has outwardly bent ears 32 which are perforate to slidably engage the rods 10. A perforate plate 34 is affixed to the closed end of the U-shaped carrier 26 and slidably engages the rods 10 in the manner of the ears 32. The carrier 26 is, therefore, shiftable longitudinally along the rods 10 between the bar 12 and the shoulder 14.

A screw 36 threadably engages the bar 12 and has a reduced section 38 on the end thereof which passes through an opening in the plate 34 and the end portion of the carrier 26 and has a thrust bearing 40 affixed to the end of said reduced section 38. The bearing 40 abuts the carrier 26, and the end of the screw 36 adjacent the reduced section abuts the plate 34 which provides positive movement of the carrier 26 longitudinal of the rods 10 when the screw 36 is rotated. A crank 42 is affixed to the end of the screw opposite to the bearing 40 and provides for manipulation of the screw 36 to accomplish movement of the carrier 26.

The reel 20 is provided with a plurality of holes 44 located radially equi-distant from the center of rotation of shaft 22 and also spaced equally in a circumferential direction. A similar opening 46 is provided in the carrier 26 in register with the circumferential center line of the holes 44 and slidably receives a pin 48 which is inserted through the opening 46 and through one of the holes 44 to releasably lock the reel 20 against rotation relative to the carrier 26.

A tension member 50 of flexible material, such as mild steel in a thin band form, is affixed to the hub of the reel 20 and wound thereon. The member 50 passes through an opening 51 in the jaw 14 and guide 16 and underlies section 18 of the guide 16. A hook-like jaw 52, having a shank 54 at right angles to the face of the jaw 52, is affixed to the member 50 by rivets 56 which pass through the shank 54, the member 50, and a reinforcing plate 58. The shank 54 engages a side of the piece to be clamped and overcomes the tendency for the jaw 52 to pivot about the corner of the work and become disconnected therefrom. The guide section 18 functions in the same manner as shank 54 to prevent the jaw 14 from rotating about the corner of the work and preventing disengagement therewith, thus stabilizing the clamping element to the workpiece.

A removable insert 60 having a shape complementary to a recess in the jaw 14 is removably affixed thereto by screw 62, the face of the insert 60 being in the plane of the jaw 14 to provide a plane smooth surface for engagement with a flat workpiece. A similar insert 64 complementary to the recess in the jaw 52 is removably affixed thereto by a screw 66 and has a face in the plane of the operative surface of the jaw 52 to provide a flat-plane engaging face for the work.

In operation, pin 48 is removed from the reel 20 to allow the reel 20 to rotate freely in the carrier 26. Jaw 52 is placed in engagement with the piece to be clamped, as shown in FIG. 2, and sufficient length of the member 50 is unreeled to allow the jaw 14 to be placed in contact with the other surface of the workpiece to be clamped. The distance which may separate the faces of jaws 52 and 14 is only limited by the length of the flexible member which may be reeled on the reel 20.

After the jaws 14 and 52 have been placed on the work, the slack is removed from the member 50 by operating the crank 28 until a small amount of tension is applied to the member 50. The pin 48 is then inserted through the opening 46 into one of the holes 44 thus locking the reel 20 against further movement and holding the clamp in snug engagement with the workpiece. Further clamping force is applied by turning the screw 36 by operating crank 42 which draws the carrier 26 away from the jaw 14, thus applying increased tension to the member 50. Sufficient turning of the screw 36 will apply the desired clamping force. Since the threads of screw 36 are self-locking, no further locking of the screw 36 is required to maintain the clamp in operative condition.

To release the clamp, the screw 36 is first operated in the opposite direction to release the tension on the member 50 whereupon the jaws 14 and 52 may be released from the work. The pin 48 is then removed, and the flexible member 50 is rewound onto the reel for storage.

It may be noted that shank 54 may pass through opening 51 to allow the operative faces of jaws 14 and 52 to come together, thus allowing the clamping of pieces of very thin material.

To apply the clamp to objects such as tubing, or other irregularly shaped objects, inserts 60 and 64 are removed to provide a concave recess for engaging the workpiece. Inserts 60 and 64 can then be replaced for re-establishing the flat working faces of the jaws 14 and 52 for clamping work having plane surfaces.

The shaft 22 is illustrated as being above the rods 10, as seen in FIG. 1. However, it is contemplated that the carrier 26 may be inverted and mounted on the rods 10 in a similar manner to change the relative positions of the periphery of the reel 20 and opening 51. If it is desired to store many turns of the flexible member 50 on the reel 20 so that when the clamp is closed the member 50 is at the periphery of the reel 20, lowering the shaft 22 would result in establishing a direct pull from the reel 20, through the opening 51 to the jaw 52.

Having thus described this invention in such full, clear, concise, and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A clamp comprising a frame, a pair of confronting clamping elements, one of said elements being affixed to the frame, a rotatable reel carried by said frame and reciprocable toward and away from said one element, a flexible tension member having a portion wound on said reel, the second clamping element being affixed to the free end of said flexible member, lock means for releasably holding said reel against rotation, and adjustable means operably connecting said frame and the reel for shifting said reel away from said one element for applying a clamping force to an object between said pair of elements.

2. A clamp comprising a frame, a pair of confronting clamping elements, one of said elements being affixed to the frame, a rotatable reel carried by said frame and reciprocable toward and away from said one element, a flexible tension member having a portion wound on said reel, the second clamping element being affixed to the free end of said flexible member, lock means for releasably holding said reel against rotation, adjustable means operably connecting said frame and the reel for shifting said reel away from said one element for applying a clamping force to an object between said pair of elements, and guide means on the frame overlying said one element and said member in the direction of the medial axis of said member.

3. A clamp comprising a frame including a shoulder and a guide normal thereto, carrier means shiftably mounted in said frame for movement toward and away from the shoulder, reel means rotatably mounted in said carrier means, lock means on said carrier means for releasably holding said reel means against rotation, a flexible tension member having a portion on said reel means, a hook on the second portion of said member, and adjustable means operably joining said frame and the carrier for positively shifting said carrier means away from said shoulder whereby said hook is urged toward said shoulder in clamping engagement with an object therebetween.

4. A clamp comprising a frame including a shoulder and a guide normal thereto, a carrier slidably mounted in said frame for reciprocation toward and away from the shoulder, a reel rotatably mounted in said carrier, lock means on said carrier for releasably holding said reel against rotation, a flexible tension member having a portion on said reel and a second free-end portion extending between the shoulder and the guide and external of said frame, a hook on the free end of said member, and manually adjustable means operably joining said frame and the carrier for shifting said carrier away from said shoulder whereby said hook is urged toward said shoulder in clamping engagement with an object therebetween.

5. A clamp comprising a frame having a shoulder, a carrier reciprocably mounted on said frame for movement toward and away from said shoulder, a reel rotatably mounted on said carrier, lock means on said carrier for releasably holding said reel against rotation, a flexible tension member having a portion on said reel and a second free-end portion extending beyond said frame and adjacent the shoulder, a hook on the free end of said member, a guide on the frame overlying the shoulder and said member in the direction of the medial axis of said member, and actuating means operably joining said frame and the carrier for shifting said carrier away from said shoulder whereby said hook is urged toward said shoulder in clamping engagement with an object therebetween.

6. A clamp comprising a frame, a carrier reciprocably mounted on said frame, a reel rotatably mounted on said carrier, keeper means on said carrier for releasably holding said reel against rotation, a flexible tension member having a portion on said reel and a second free-end portion extending beyond said frame, a hook on the free end of said member, a shoulder on said frame adjacent said member having a planar face generally normal to the medial axis of said member, a guide on the frame overlying said shoulder and said member in the direction of the axis of said member, and manually adjustable means operably joining said frame and the carrier for shifting said carrier away from said shoulder whereby said hook is urged toward said shoulder in clamping engagement with an object therebetween.

7. A clamp comprising a frame, a carrier reciprocably mounted on said frame, a reel rotatably mounted on said carrier, keeper means on said carrier for releasably holding said reel against rotation, a flexible tension member having a portion on said reel and a second free-end portion extending beyond said frame, a hook on the free end of said member, a shoulder on said frame adjacent said member having a planar face generally normal to the medial axis of said member, said hook having a planar face confronting the face on said shoulder, a guide on the frame overlying said shoulder and said member in the direction of the axis of said member, and screw means operably joining said frame and the carrier for shifting said carrier away from said shoulder whereby said hook is urged toward said shoulder in clamping engagement with an object therebetween.

8. A clamp comprising a frame having a shoulder, said shoulder including a work-engaging face, a rotatable reel carried by said frame and reciprocable toward and away from said shoulder, a flexible tension member having a portion wound on said reel, a second portion extending beyond said shoulder, a hook on the second portion having a work-engaging face, lock means for releasably holding said reel against rotation, adjustable means operably connecting said frame and the reel for shifting said reel away from said shoulder for applying the clamping force to an object between the faces of said shoulder and the hook, a recess in each of said faces respectively, and an insert complementary to said recess removably affixed to said shoulder and said hook, said insert having a plane surface in the plane of said faces.

9. A clamp comprising a frame having a shoulder, said shoulder including a work-engaging face, a rotatable reel carried by said frame and reciprocable toward and away from said shoulder, a flexible tension member having a portion wound on said reel, a second portion extending beyond said shoulder, a hook on the second portion having a work-engaging face, lock means for releasably holding said reel against rotation, adjustable means operably connecting said frame and the reel for shifting said reel away from said shoulder for applying the clamping force to an object between the faces of said shoulder and the hook, a cylindrical recess in each of said faces respectively, and an insert complementary to each recess respectively and removably affixed to said shoulder and said hook, said insert having a plane surface in the plane of said faces.

10. A clamp comprising a frame having a shoulder, said shoulder including a work-engaging face, a rotatable reel carried by said frame and reciprocable toward and away from said shoulder, a flexible tension member having a portion wound on said reel, a second portion extending beyond said shoulder, a hook on the second portion having a work-engaging face confronting the face on said shoulder, lock means for releasably holding said reel against rotation, screw means operably connecting said frame and the reel for shifting said reel away from said shoulder for applying the clamping force to an object between the faces of said shoulder and the hook, a cylindrical recess in said faces, and a cylindrical insert complementary to said recess removably affixed to said shoulder and said hook, said insert having a plane surface in the plane of said faces.

References Cited in the file of this patent

UNITED STATES PATENTS

| | | |
|---|---|---|
| 109,121 | Findlay | Nov. 8, 1870 |
| 835,990 | Tindall | Nov. 13, 1906 |
| 923,805 | Blake | June 8, 1909 |
| 1,340,712 | Hare | May 18, 1920 |
| 1,441,464 | Watson | Jan. 9, 1923 |
| 1,625,258 | Jelbert | Apr. 19, 1927 |

FOREIGN PATENTS

| | | |
|---|---|---|
| 424,459 | Italy | Aug. 22, 1947 |